US011772035B2

(12) United States Patent
Doherty et al.

(10) Patent No.: US 11,772,035 B2
(45) Date of Patent: Oct. 3, 2023

(54) AIR SEPARATION MODULES, NITROGEN GENERATION SYSTEMS, AND METHODS OF MAKING AIR SEPARATION MODULES

(71) Applicant: Hamilton Sundstrand Corporation, Charlotte, NC (US)

(72) Inventors: James R. Doherty, Feeding Hills, MA (US); Beakal T. Woldemariam, South Windsor, CT (US); David Anderson, Enfield, CT (US); Donald E. Army, Enfield, CT (US); Eric Surawski, Hebron, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 828 days.

(21) Appl. No.: 16/710,761

(22) Filed: Dec. 11, 2019

(65) Prior Publication Data

US 2021/0178314 A1   Jun. 17, 2021

(51) Int. Cl.
*B01D 53/02* (2006.01)
*B01D 53/04* (2006.01)
(Continued)

(52) U.S. Cl.
CPC ..... *B01D 53/0415* (2013.01); *B01D 46/0036* (2013.01); *B01D 53/0446* (2013.01);
(Continued)

(58) Field of Classification Search
CPC .......... B01D 2053/221; B01D 2256/10; B01D 2257/104; B01D 2258/06;
(Continued)

(56) References Cited

U.S. PATENT DOCUMENTS 3,796,026 A   3/1974 Mugford
3,832,830 A   9/1974 Gerow
(Continued)

FOREIGN PATENT DOCUMENTS

CN   106268335 A   1/2017
EP   3020467 A1   5/2016
(Continued)

OTHER PUBLICATIONS

European Office Action; European Application No. 20213190.0; dated: Jan. 7, 2022; 6 pages.
(Continued)

*Primary Examiner* — Christopher P Jones
(74) *Attorney, Agent, or Firm* — CANTOR COLBURN LLP

(57) ABSTRACT

An air separation module includes a separator, a canister, and a nominal-length end cap. The separator is arranged to separate ambient air into an oxygen-enriched air fraction and a nitrogen-enriched air fraction. The canister supports the separator and has a canister end flange, a canister intermediate flange and a canister end, the canister intermediate flange arranged between the canister end flange and the canister end. The nominal-length end cap is fixed to the canister end flange, and the separator extends between the canister end flange and the canister end. Nitrogen generation systems and methods of generating nitrogen-enriched air flows are also described.

18 Claims, 3 Drawing Sheets

(51) Int. Cl.
*B01D 46/00* (2022.01)
*B64D 37/32* (2006.01)

(52) U.S. Cl.
CPC .......... *B64D 37/32* (2013.01); *B01D 2256/10* (2013.01); *B01D 2257/104* (2013.01); *B01D 2259/4575* (2013.01)

(58) Field of Classification Search
CPC .... B01D 2259/4566; B01D 2259/4575; B01D 46/0036; B01D 53/0415; B01D 53/0446; B01D 53/22; B64D 37/32
See application file for complete search history.

(56) References Cited

U.S. PATENT DOCUMENTS

| | | | |
|---|---|---|---|
| 5,410,999 | A | 5/1995 | Gillespie et al. |
| 8,110,027 | B2 | 2/2012 | Beeson |
| 8,361,181 | B2 | 1/2013 | Osendorf et al. |
| 8,979,983 | B2 | 3/2015 | Eowsakul |
| 9,452,381 | B2 | 9/2016 | Peacos, III et al. |
| 9,700,828 | B2 | 7/2017 | Moredock et al. |
| 9,802,159 | B2 | 10/2017 | Rekow et al. |
| 9,855,544 | B2 | 1/2018 | Peacos, III et al. |
| 9,925,497 | B2 | 3/2018 | Daniello |
| 9,932,125 | B2 | 4/2018 | Mcauliffe et al. |
| 9,932,234 | B2 | 4/2018 | Daniello |
| 2006/0201872 | A1 | 9/2006 | Fall et al. |
| 2008/0190082 | A1 | 8/2008 | Scott et al. |
| 2010/0024649 | A1 | 2/2010 | Semmere et al. |
| 2012/0304856 | A1 | 12/2012 | Kanetsuki et al. |
| 2012/0312162 | A1 | 12/2012 | Theodore et al. |
| 2014/0331857 | A1 | 11/2014 | Massey et al. |
| 2014/0360373 | A1 | 12/2014 | Peacos et al. |
| 2015/0196871 | A1 | 7/2015 | Komiya et al. |
| 2016/0136570 | A1 | 5/2016 | Mcauliffe et al. |
| 2016/0184761 | A1 | 6/2016 | Peacos, III et al. |
| 2016/0184793 | A1 | 6/2016 | Peacos, III et al. |
| 2016/0243496 | A1 | 8/2016 | Roussn-Bouchard et al. |
| 2017/0074699 | A1 | 3/2017 | Mullin et al. |
| 2018/0087698 | A1 | 3/2018 | Lenn et al. |
| 2018/0250625 | A1 | 9/2018 | Pflueger |
| 2019/0336668 | A1 | 11/2019 | Gyoten et al. |
| 2021/0178301 | A1 | 6/2021 | Doherty et al. |
| 2021/0178302 | A1 | 6/2021 | Doherty et al. |
| 2021/0178315 | A1 | 6/2021 | Doherty et al. |
| 2021/0178320 | A1 | 6/2021 | Doherty et al. |

FOREIGN PATENT DOCUMENTS

| | | |
|---|---|---|
| EP | 3040278 A1 | 7/2016 |
| EP | 3574937 A1 | 12/2019 |
| EP | 2717998 B1 | 9/2020 |
| GB | 2533585 A | 6/2016 |
| KR | 20180049598 A | 5/2018 |
| KR | 101863855 B1 | 6/2018 |
| WO | 02090823 A1 | 11/2002 |
| WO | 2013079466 A2 | 6/2013 |
| WO | 2017106644 A1 | 6/2017 |

OTHER PUBLICATIONS

European Search Report for Application No. 20209734.1, dated May 11, 2021, 52 pages.
European Search Report for Application No. 20213190.0, dated Apr. 30, 2021, 107 pages.
European Search Report for Application No. 20213504.2, dated May 3, 2021, 108 pages.
European Search Report for Application No. 20213555.4, dated May 6, 2021, 155 pages.
U.S. Restriction Requirement for U.S. Appl. No. 16/710,795, dated: Oct. 13, 2021, 7 pages.
Piquet Bruno: "Jul. 2009 Flight Air Worthiness", Jul. 31, 2009 (Jul. 31, 2009), pp. 1-36.
U.S. Non Final Office Action for U.S. Appl. No. 16/710,783, dated Dec. 22, 2021, 12 pages.
U.S. Non-Final Office Action for U.S. Appl. No. 16/710,773, dated: Oct. 28, 2021, 20 pages.
U.S. Non-Final Office Action for U.S. Appl. No. 16/710,783, dated Jul. 14, 2021, 20 pages.
U.S. Non-Final Office Action for U.S. Appl. No. 16/710,795, dated Feb. 8, 2022, 36 pages.
U.S. Notice of Allowance for U.S. Appl. No. 16/710,773, dated: Feb. 23, 2022, 8 pages.
European Search Report for Application No. 20209888.5, dated May 11, 2021, 85 pages.
U.S. Final Office Action for U.S. Appl. No. 16/710,795, dated Jun. 17, 22, 52 pages.
U.S. Notice of Allowance for U.S. Appl. No. 16/710,783, dated: Aug. 3, 2022, 14 pages.
U.S. Notice of Allowance for U.S. Appl. No. 16/710,773, dated: Jun. 7, 2022, 15 pages.
EPO Official Letter for Application No. 20213555.4, dated Oct. 19, 2022, 22 pages.
U.S. Final Office Action for U.S. Appl. No. 16/710,795, dated Nov. 7, 2022, 23 pages.
EPO Official Letter for Application No. Application No. 20209888.5, dated Mar. 13, 2023, 9 Pages.

AIR SEPARATION MODULES, NITROGEN GENERATION SYSTEMS, AND METHODS OF MAKING AIR SEPARATION MODULES

BACKGROUND

The present disclosure generally relates to nitrogen generation systems, and more particularly to air separation modules for nitrogen generation systems such as in aircraft.

Vehicles, such as aircraft, commonly carry fuel in fuel tanks. The fuel generally resides within the fuel tank as a liquid and bounds an ullage space defined within the fuel tank. The atmosphere within the ullage space typically harbors a mixture of fuel vapor and air from the ambient environments. Since mixtures of fuel vapors and ambient air can be potentially hazardous, e.g., due to combustion in the event of a spark or flame, some vehicles employ inerting systems. Inerting systems limit oxygen concentration within fuel tank ullage spaces by reducing oxygen concentration in the ullage space, generally with an air separation module.

Air separation modules separate air received from the ambient environment into an oxygen-enriched air flow and a nitrogen-enriched air flow. The nitrogen-enriched air flow is generally provided to the vehicle fuel tanks by the nitrogen generation system in volume sufficient to limit concentration of oxygen within the fuel tank ullage space to below that sufficient to support combustion. The number of the air separation modules employed by the nitrogen generation system, as well as the size of the associated installation space within the vehicle required for air separation module, generally corresponds to the volume of nitrogen-enriched air required for the vehicle fuel tanks. Vehicles requiring smaller nitrogen-enriched air flows typically employ fewer air separation modules than those requiring larger flows.

Such systems and methods have generally been acceptable for their intended purpose. However, there remains a need for improved air separation modules, nitrogen generation systems having air separation modules, and methods of making air separation modules for nitrogen generation systems.

BRIEF DESCRIPTION

An air separation module is provided. The air separation module includes a separator, a canister, and a nominal-length end cap. The separator is arranged to separate ambient air into an oxygen-enriched air fraction and a nitrogen-enriched air fraction. The canister supports the separator and has a canister end flange, a canister intermediate flange and a canister end, the canister intermediate flange arranged between the canister end flange and the canister end. The nominal-length end cap is fixed to the canister end flange, and the separator extends between the canister end flange and the canister end.

In addition to one or more of the features described above, or as an alternative, further embodiments of the air separation module may include that the separator has a separator length, that the canister has flange spacing distance defined between the canister end flange and the canister intermediate flange, and that the separator length is greater than the flange spacing distance.

In addition to one or more of the features described above, or as an alternative, further embodiments of the air separation module may include an extended-length end cap, that the extended-length end cap is longer than the nominal-length end cap, and that the canister intermediate flange couples the extended-length end cap to the canister.

In addition to one or more of the features described above, or as an alternative, further embodiments of the air separation module may include a flow control valve supported by the extended-length end cap, that the extended-length end cap fluidly couples the flow control valve with the separator to communicate a compressed air flow to the separator.

In addition to one or more of the features described above, or as an alternative, further embodiments of the air separation module may include that the extended-length end cap has an extended-length end cap mounting feature for fixation of the air separation module within an aircraft, and that the extended-length end cap mounting feature is adjacent to the canister intermediate flange.

In addition to one or more of the features described above, or as an alternative, further embodiments of the air separation module may include that the extended-length end cap has an extended-length end cap flange, and that the extended-length end cap flange is fastened to the canister intermediate flange.

In addition to one or more of the features described above, or as an alternative, further embodiments of the air separation module may include that a portion of the canister between the canister end and the canister intermediate flange spaces the separator from the extended-length end cap.

In addition to one or more of the features described above, or as an alternative, further embodiments of the air separation module may include that a terminal portion of the separator is arranged within the extended-length end cap.

In addition to one or more of the features described above, or as an alternative, further embodiments of the air separation module may include that the nominal-length end cap has a nominal-length end cap flange and that the nominal-length end cap flange couples the nominal-length end cap to the canister end flange.

In addition to one or more of the features described above, or as an alternative, further embodiments of the air separation module may include that the separator terminates at the canister end flange and that the nominal-length end cap has no mounting feature for fixation of the air separation module within an aircraft.

In addition to one or more of the features described above, or as an alternative, further embodiments of the air separation module may include that the canister has a diameter that is about nine (9) inches (about 23 centimeters).

In addition to one or more of the features described above, or as an alternative, further embodiments of the air separation module may include a filter module supported by the nominal-length end cap and that the nominal-length end cap fluidly couples the separator to the filter module for filtering the nitrogen-enriched air fraction from the separator.

In addition to one or more of the features described above, or as an alternative, further embodiments of the air separation module may include that the canister defines a discharge port for discharging an oxygen-enriched received from the separator.

A nitrogen generation system is also provided. The nitrogen generation system includes an air separation module as described above; an extended-length end cap, the canister intermediate flange coupling the extended-length end cap to the canister intermediate flange; and a flow control valve supported by the extended-length end cap, and that the extended-length end cap fluidly couples the flow control valve with the separator to issue a nitrogen-enriched air flow from the canister.

In addition to one or more of the features described above, or as an alternative, further embodiments of the nitrogen generation system may include that the canister defines an overboard air discharge port for discharging an oxygen-enriched received from the separator, and that the nitrogen generation system further includes a filter module supported by the nominal-length end cap, the nominal-length end cap fluidly coupling the filter module to the separator for communicating compressed air the separator.

In addition to one or more of the features described above, or as an alternative, further embodiments of the nitrogen generation system may include that a terminal portion of the separator is arranged within the extended-length end cap, that the extended-length end cap has an extended-length end cap flange, and that the extended-length end cap flange is fastened to the canister intermediate flange.

In addition to one or more of the features described above, or as an alternative, further embodiments of the nitrogen generation system may include that a portion of the canister between the canister end and the canister intermediate flange spaces the separator from the extended-length end cap, that the extended-length end cap has an extended-length end cap mounting feature for fixation of the air separation module within an aircraft, and that the extended-length end cap mounting feature is adjacent to the canister intermediate flange.

In addition to one or more of the features described above, or as an alternative, further embodiments of the nitrogen generation system may include a fuel tank carried by an aircraft and that the fuel tank is fluidly coupled to the separator through the flow control valve.

A method of making an air separation module is additionally provided. The method includes defining a canister having a canister end flange, a canister intermediate flange and a canister end, the canister intermediate flange arranged between the canister end flange and the canister end; supporting a separator configured to separate ambient air into an oxygen-enriched air fraction and a nitrogen-enriched air fraction within the canister such that the separator extends between the canister end flange to the canister end; and fixing a nominal-length end cap to the canister end flange.

In addition to one or more of the features described above, or as an alternative, further embodiments of the nitrogen generation system may include fixing an extended-length end cap to the canister intermediate flange; supporting a flow control valve with the extended-length end cap; fluidly coupling the flow control valve with the separator to issue a nitrogen-enriched air flow from the canister; supporting a filter module with the nominal-length end cap; and fluidly coupling the filter module to separator to provide a compressed air flow to the separator.

Technical effects of the present disclosure include relatively large inerting capability in relation to space occupied by the air separation module. In certain examples air separation modules described herein have canisters separators of length greater than the spacing distance between the air separation module end caps, providing larger canister volume than that defined within the canister between the air separation module ends caps. In accordance with certain examples air separation modules described herein include separators partially contained within at least one of the end caps, providing larger canister volume than that defined between within the canister between the air separation module end caps.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
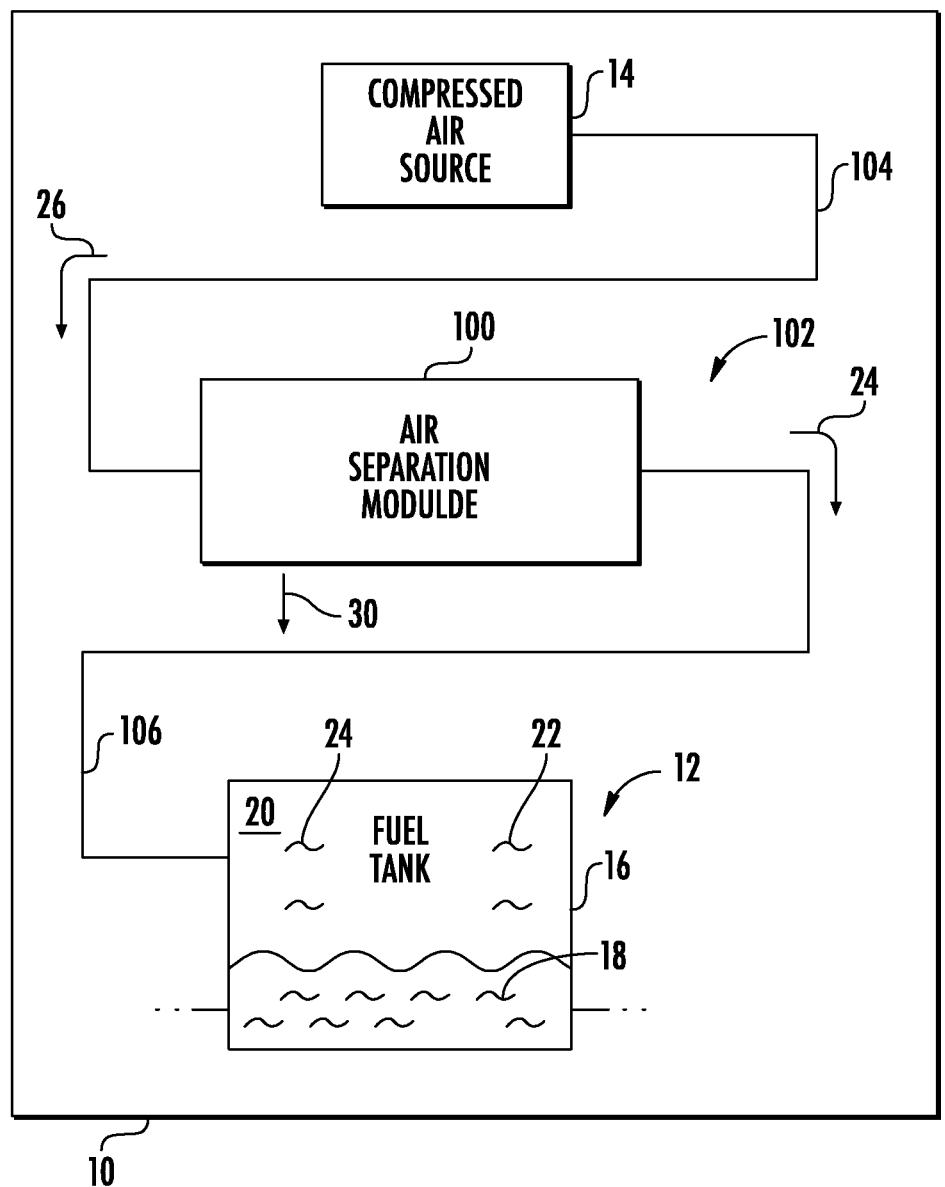
FIG. 1 is a schematic view of an air separation module constructed in accordance with the present disclosure, showing a nitrogen generation system carried by an aircraft and including the air separation module providing a nitrogen-enriched air flow to a fuel tank.

Reference will now be made to the drawings wherein like reference numerals identify similar structural features or aspects of the subject disclosure. For purposes of explanation and illustration, and not limitation, a partial view of an example of an air separation module constructed in accordance with the disclosure is shown in FIG. 1 and is designated generally by reference character 100. Other embodiments of air separation modules, nitrogen generation systems having air separation modules, and methods of making air separation modules for nitrogen generation systems, are provided in FIGS. 2-4, as will be described. The systems and methods described herein can be used for generating nitrogen-enriched air flows for inerting fuel tanks, such as fuel tanks carried by aircraft, though the present disclosure is not limited to fuel tanks or to aircraft in general.

Referring to FIG. 1, a vehicle 10, e.g., an aircraft is shown. The vehicle 10 includes a fuel system 12, a compressed air source 14, and a nitrogen generation system 102. The fuel system 12 includes a fuel tank 16 containing liquid fuel 18. The liquid fuel 18 and the fuel tank 16 define between one another an ullage space 20. The ullage space 20 is in fluid communication with the nitrogen generation system 102 and contains therein a mixture of fuel vapors 22 and a nitrogen-enriched air faction 24 provided by the nitrogen generation system 102. It is contemplated that that the nitrogen-enriched air fraction be sufficient to retain concentration of oxygen within the ullage space 20 to limit (or eliminate entirely) probability of fuel vapor combustion in the event that an ignition source comes into communication with the fuel vapors 22. In certain examples the compressed air source 14 can be a compressor section of a gas turbine engine.

The nitrogen generation system 102 includes a source conduit 104, a supply conduit 106, and the air separation module 100. The source conduit 104 fluidly connects the compressed air source 14 to the air separation module 100. The supply conduit fluid connects the air separation module 100 to the fuel system 12, e.g., to the fuel tank 16. The compressed air source 14 is configured to provide a compressed air flow 26, e.g., a bleed air flow from a gas turbine engine, from the ambient environment 28. The air separation module 100 is configured to separate the compressed air flow 26 into the nitrogen-enriched air fraction 24, which the air separation module 100 provides to the supply conduit 106, and an oxygen-enriched air faction 30, which the air separation module 100 returns to the ambient environment 28 via a discharge port 108 (shown in FIG. 2). The supply conduit 106 provides the nitrogen-enriched air fraction 24 to the fuel system 12, e.g., to inert the ullage space 20 within the fuel tank 16.

Figure 2:
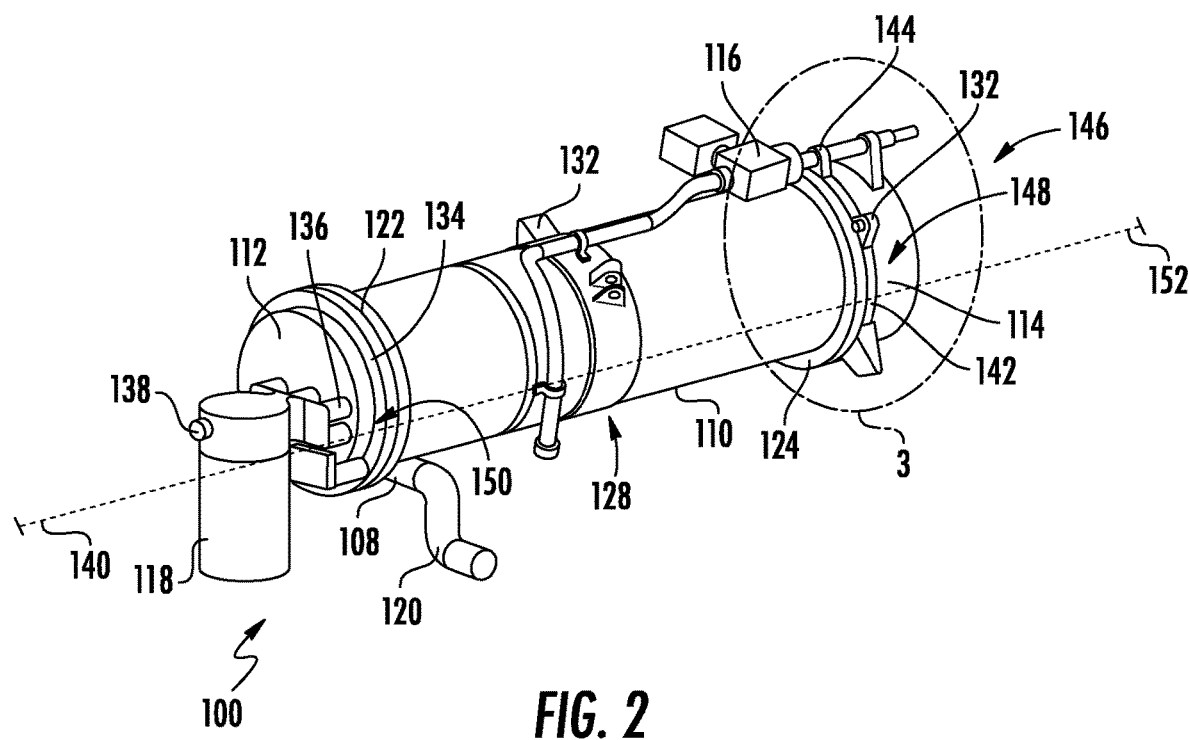
FIG. 2 is a perspective view of the air separation module of FIG. 1 according to an example, showing an end cap housing a portion of the air separation module canister and separator.

With reference to FIG. 2, the air separation module 100 is shown. The air separation module 100 includes a canister 110, a nominal-length end cap 112, and an extended-length end cap 114. The air separation module 100 also includes a flow control valve 116, a filter module 118, and an oxygen-enriched air fraction duct 120.

The canister 110 has a canister end flange 122, a canister intermediate flange 124, and a canister end 126 (shown in FIG. 2). The canister 110 also has a thickened portion 128, one or more canister mounting feature 132, and defines the discharge port 108. The canister end 126 is arranged within the extended-length end cap 114, is arranged on an end of the canister 110 opposite the canister end flange 122 and is configured to couple the extended-length end cap 114 to the extended-length end cap 114 to the canister 110. The canister end flange 122 is arranged on an end of the canister 110 opposite the extended-length end cap 114 and is configured to couple the nominal-length end cap 112 to the canister 110. In certain examples the canister 110 has a diameter 168 (shown in FIG. 3) that is about nine (9) inches (about 23 centimeters), which allows the air separation module 100 to serve as a drop-in replacement for a legacy air separation module having smaller nitrogen-enriched air flow generating capability.

The canister intermediate flange 124 is arranged between the canister end 126 and the canister end flange 122. The thickened portion 128 of the canister 110 is arranged to provide longitudinal stiffness to the canister 110 and, in the illustrated example, couples the one or more canister mounting feature 132 to the canister 110. The one or more canister mounting feature 132 are arranged for fixation of the air separation module 100 to a vehicle, e.g., the vehicle 10 (shown in FIG. 1). In the illustrated example the one or more canister mounting feature 132 is arranged to seat therein a tie-rod, which allows the air separation module 100 to be fixed within certain legacy nitrogen generation systems.

The nominal-length end cap 112 has a nominal-length end cap flange 134, a filter support 136 and defines an inlet port 138. The filter support 136 is arranged on a side of the nominal-length end cap 112 opposite the nominal-length end cap flange 134. The nominal-length end cap flange 134 extends about the nominal-length end cap 112, has a fastener pattern 150 and receives therethrough a plurality of fasteners 140. The plurality of fasteners 140 fix the nominal-length end cap 112 against the canister end flange 122, the nominal-length end cap 112 thereby connected to the canister 110. The filter support 136 is configured to seat thereon a filter module 118. The inlet port 138 extends through the nominal-length end cap 112 and fluidly connects the canister 110 to the filter module 118, and therethrough with the source conduit 104.

The extended-length end cap 114 is similar to the nominal-length end cap 112 and additionally includes an extended-length end cap flange 142, a flow control valve support 144, and an extended-length end cap mounting feature 146. The flows control valve support 144 is configured to seat thereon the flow control valve 116 and is arranged with extended-length end cap flange 142 on a common end of the extended-length end cap 114. The extended-length end cap flange 142 extends about the extended-length end cap 114, has a fastener pattern 148, and receives therethrough a plurality of fasteners 152. The plurality of fasteners 152 fix the extended-length end cap 114 against the canister intermediate flange 124, the extended-length end cap 114 thereby connected to the canister 110. The extended-length end cap mounting feature 146 is configured to fix the air separation module 100 in the vehicle 10 (shown in FIG. 1), e.g., by seating therein a tie rod or airframe structure. An outlet port 154 (shown in FIG. 3) extends through the extended-length end cap 114 and fluidly connects with the flow control valve 116, and therethrough with the supply conduit 106 to provide the nitrogen-enriched air fraction 24 (shown in FIG. 1) to the fuel tank 16 (shown in FIG. 1).

Figure 3:
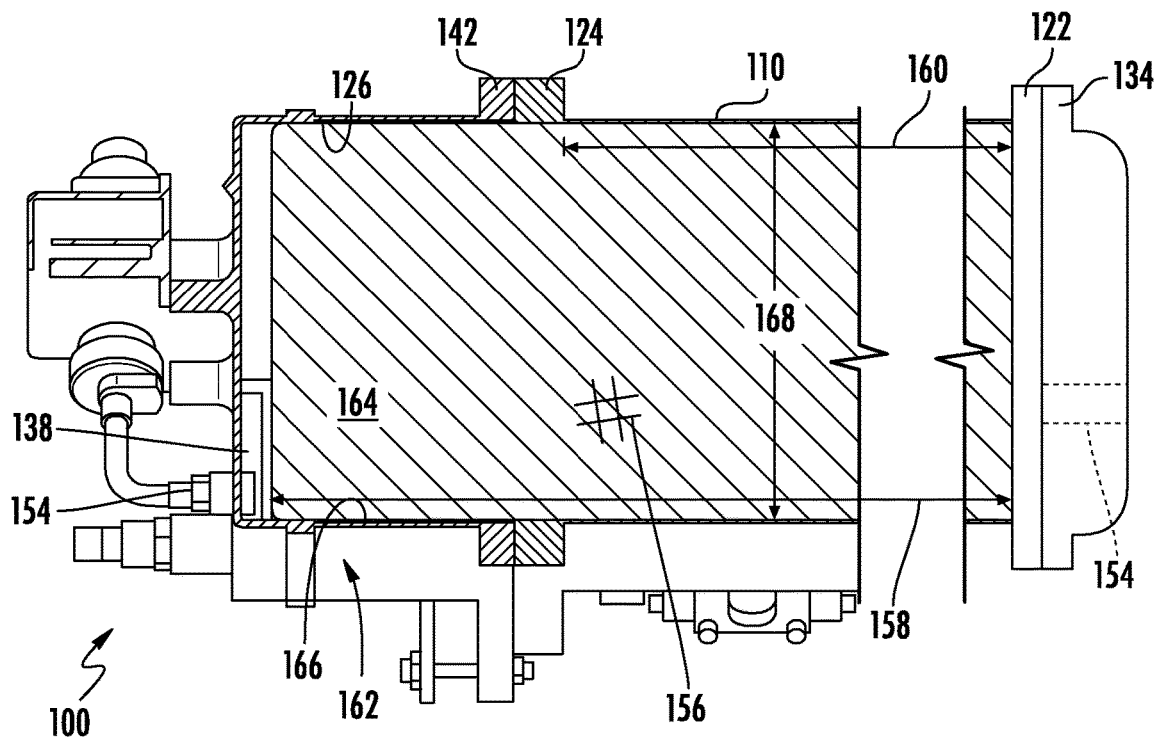
FIG. 3 is a cross-sectional view of the air separation module of FIG. 1 according to the example, showing the canister and separator extending beyond a canister intermediate flange connecting the end cap to the canister.

With reference to FIG. 3, the air separation module 100 is shown. The air separation module 100 generally includes a separator 156 configured to separate ambient air, e.g., the compressed air flow 26 (shown in FIG. 1), into an oxygen-enriched air fraction, e.g., the oxygen-enriched air fraction 30 (shown in FIG. 1), and a nitrogen-enriched air fraction, the nitrogen-enriched air fraction 24. The canister 110 supports the separator 156 and has the canister end flange 122, the canister intermediate flange 124 and the canister end 126. The canister intermediate flange 124 is arranged between the canister end flange 122 and the canister end 126. The nominal-length end cap 112 is fixed to canister end flange 122 and the separator 156 extends between the canister end flange 122 and the canister end 126.

It is contemplated that air separation module 100 be extended, e.g., be of length greater than that of certain legacy air separation modules. In this respect, in certain embodiments, the separator 156 has a separator length 158, the canister has a flange spacing distance 160 defined between the canister end flange 122 and the canister intermediate flange 124, and the separator length 158 is greater than the flange spacing distance 160. In accordance with certain embodiments, the extended-length end cap 114 has an extended end cap portion 162 extending from the extended-length end cap flange 142 in a direction opposite the nominal-length end cap 112, and a separator terminal portion 164 is contained within the extended end cap portion 162 of the extended-length end cap 114. It is also contemplated that a canister extended portion 166 of the canister 110, arranged between the canister end 126 and the canister intermediate flange 124, space the extended-length end cap 114 from the separator 156. This allows the canister 110 to support the separator terminal portion 164 prior to and during assembly of the extended-length end cap 114 on the canister 110.

In the illustrated example the nominal-length end cap 112 is coupled to the canister 110 by the nominal-length end cap flange 134. In this respect the nominal-length end cap flange 134 is fixed to the canister end flange 130 by the plurality of fasteners 152, which are seated in the fastener pattern 150. Fixation of the nominal-length end cap 112 to the canister 110 with the nominal-length end cap flange 134 and the canister end flange 130 provides stiffness to the air separation module 100. In certain examples the stiffness allows the filter module 118 to be supported by the nominal-length end cap 112 such that the nominal-length end cap 112 fluidly couples the separator 156 to the filter module 118 for filtering the nitrogen-enriched air fraction 24 (shown in FIG. 1) issued from the canister 110. In accordance with certain example the separator 156 terminates at the canister end flange 122 and no mounting feature for fixation of the air separation module 100 within the vehicle 10, e.g., an aircraft, allowing the air separation module 100 to extend from an installation envelope of a legacy air separation module and occupy additional space adjacent the to the installation envelope.

In the illustrated example the extended-length end cap 114 is longer than the nominal-length end cap 112 and is coupled to the canister 110 by the canister intermediate flange 124. In certain examples the extended-length end cap flange 142 couples the extended-length end cap 114 to the canister intermediate flange 124, e.g., via a plurality of fasteners 152 (shown in FIG. 1) received within the fastener pattern 150 (shown in FIG. 1). The canister intermediate flange 124 to the extended-length end cap flange 142 provides stiffness to the air separation module 100, allowing the separator 156 and the canister extended portion 166 to extend into the extended-length end cap 114. In certain examples the flow control valve 148 is supported by the extended-length end cap 114 and the extended-length end cap 114 fluidly couples the flow control valve 148 with the separator 156 to communicate a compressed air flow 26 (shown in FIG. 1) to the separator 154. In accordance with certain embodiments, the second end mounting feature of the extended-length end cap 114 can be adjacent to the canister intermediate flange 124 for fixation of the air separation module 100 within the vehicle 10 (shown in FIG. 1).

Figure 4:
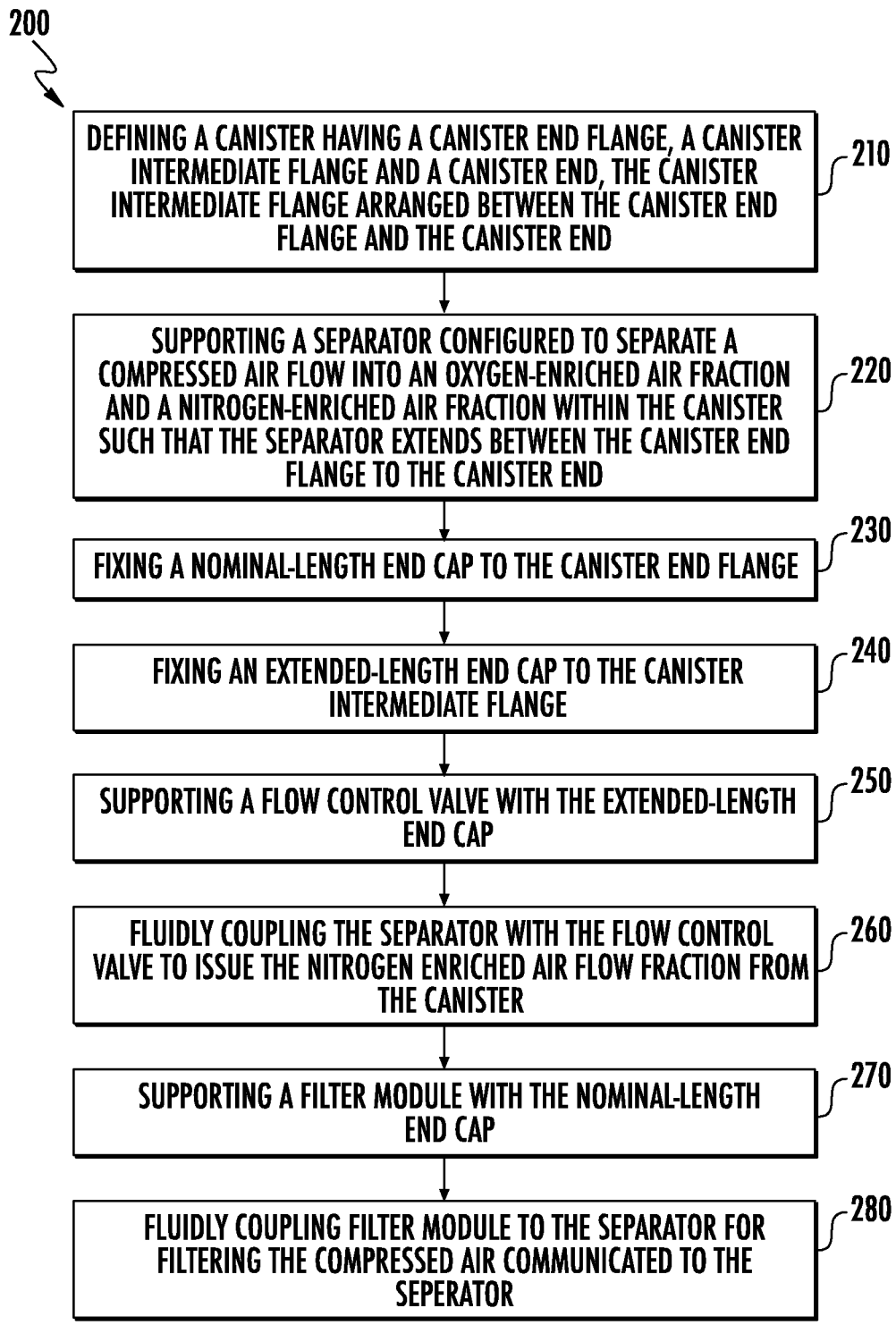
FIG. 4 is a block diagram of a method of making an air separation module, showing operations of the method according to an illustrative and non-limiting example of the method.

With reference to FIG. 4, a method 200 of making air separation module, e.g., the air separation module 100, is shown. The method 200 includes defining a canister having a canister end flange, a canister intermediate flange, and a canister end, the canister intermediate flange arranged between the canister end flange and the canister end; e.g., the canister 110 (shown in FIG. 2) having the canister end 126 (shown in FIG. 2), the canister intermediate flange 124 (shown in FIG. 2), and the canister end flange 130 (shown in FIG. 2); as shown with box 210. The method 200 also includes supporting a separator configured to separate a compressed air flow into an oxygen-enriched air fraction and a nitrogen-enriched air fraction, e.g., the separator 156 (shown in FIG. 3), within the canister such that the separator extends between the canister end flange to the canister end, as shown with box 220. The method 200 additionally includes fixing a nominal-length end cap, e.g., the nominal-length end cap 112 (shown in FIG. 2), to the canister end flange, as shown box 230.

As shown with box 240, it is contemplated that the method 200 additionally includes fixing an extended-length end cap, e.g., the extended-length end cap 114 (shown in FIG. 2) to the canister intermediate flange. In certain examples the method includes supporting a flow control valve, e.g., the flow control valve 116 (shown in FIG. 2), from the extended-length end cap such that the separator is fluidly coupled to the flow control valve to issue the nitrogen-enriched air flow fraction from the canister, as shown with boxes 250 and 260. In accordance with certain examples the method 200 includes supporting a filter module, e.g., the filter module 118 (shown in FIG. 2), with the nominal-length end cap and fluidly coupling the separator to the filter module for filtering the compressed air flow communicated to the separator, e.g., the compressed air flow 26 (shown in FIG. 1), as shown with boxes 270 and 280.

Fuel tanks, such as fuel tanks used to store liquid fuel in vehicles like aircraft, commonly contain fuel vapors within the ullage space of the fuel tank. Because such fuel vapors can present a fire hazard some vehicles include nitrogen generation systems with air separation modules. The air separation modules are typically arranged to provide a flow of nitrogen-enriched air to the fuel tank ullage space, limiting concentration of oxygen within the fuel tank ullage space and reducing (or eliminating entirely) the fire hazard potentially posed by the fuel vapors. The volume of nitrogen enriched air is generally constrained by the size of the air separation module and space allocated to the air separation module within the vehicle.

In examples provided herein air separation modules are provided with extended separators to provide relatively large nitrogen-enriched air flow generation capacity. In certain examples the diameter and/or placement of the fixation features of the air separation module corresponds an installation envelope of a legacy air separation module. In accordance with certain examples air separation modules include an extended-length end cap. The extended-length end cap provides increased canister volume, portions of the canister length and the separator arranged within the extended-length end cap to provide additional nitrogen-enriched air flow generation capacity, the air separation module thereby providing increased inerting capability within a predetermined, e.g., legacy, air separation module installation envelop.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An air separation module, comprising:
   a separator configured to separate ambient air into an oxygen-enriched air fraction and a nitrogen-enriched air fraction;
   a canister supporting the separator and having a canister end flange, a canister intermediate flange and a canister end, the canister intermediate flange arranged between the canister end flange and the canister end; and
   an end cap fixed to the canister end flange, wherein the separator extends between the canister end flange and the canister end;
   a filter module supported by and connected to a distal end of the end cap, wherein the end cap fluidly couples the separator to the filter module for filtering the nitrogen-enriched air fraction from the separator.

2. The air separation module of claim 1, wherein the separator has a separator length, wherein the canister has a flange spacing distance defined between the canister end flange and the canister intermediate flange, and wherein the separator length is greater than the flange spacing distance.

3. The air separation module of claim 1, further comprising an extended-length end cap, wherein the extended-length end cap is longer than the end cap, and wherein the canister intermediate flange couples the extended-length end cap to the canister.

4. The air separation module of claim 3, further comprising a flow control valve supported by the extended-length end cap, wherein the extended-length end cap fluidly couples the flow control valve with the separator to communicate a compressed air flow to the separator.

5. The air separation module of claim 3, wherein the extended-length end cap has an extended-length end cap mounting feature for fixation of the air separation module within an aircraft, wherein the extended-length end cap mounting feature is adjacent to the canister intermediate flange.

6. The air separation module of claim 3, wherein the extended-length end cap has an extended-length end cap flange, wherein the extended-length end cap flange is fastened to the canister intermediate flange.

7. The air separation module of claim 3, wherein a portion of the canister between the canister end and the canister intermediate flange spaces the separator from the extended-length end cap.

8. The air separation module of claim 3, wherein a terminal portion of the separator is arranged within the extended-length end cap.

9. The air separation module of claim 1, wherein the end cap has an end cap flange, wherein the end cap flange couples the end cap to the canister end flange.

10. The air separation module of claim 1, wherein the separator terminates at the canister end flange, wherein the end cap has no mounting feature for fixation of the air separation module within an aircraft.

11. The air separation module of claim 1, wherein the canister defines a discharge port for discharging oxygen-enriched air received from the separator.

12. A nitrogen generation system, comprising:
   an air separation module as recited in claim 1;
   an extended-length end cap that is longer than the end cap, the canister intermediate flange coupled to the extended-length end cap; and
   a flow control valve supported by the extended-length end cap, wherein the extended-length end cap fluidly couples the flow control valve with the separator to issue a nitrogen-enriched air flow from the canister.

13. The nitrogen generation system of claim 12, wherein the canister defines an overboard air discharge port for discharging oxygen-enriched air received from the separator.

14. The nitrogen generation system of claim 12, wherein a terminal portion of the separator is arranged within the extended-length end cap, wherein the extended-length end cap has an extended-length end cap flange, and wherein the extended-length end cap flange is fastened to the canister intermediate flange.

15. The nitrogen generation system of claim 12, wherein a portion of the canister between the canister end and the canister intermediate flange spaces the separator from the extended-length end cap, wherein the extended-length end cap has an extended-length end cap mounting feature for fixation of the air separation module within an aircraft, wherein the extended-length end cap mounting feature is adjacent to the canister intermediate flange.

16. The nitrogen generation system of claim 12, further comprising a fuel tank carried by an aircraft, wherein the fuel tank is fluidly coupled to the separator through the flow control valve.

17. A method of making an air separation module, comprising:
   defining a canister having a canister end flange, a canister intermediate flange and a canister end, the canister intermediate flange arranged between the canister end flange and the canister end;
   supporting a separator configured to separate ambient air into an oxygen-enriched air fraction and a nitrogen-enriched air fraction within the canister such that the separator extends between the canister end flange to the canister end;
   fixing an end cap to the canister end flange; and
   supporting a filter module with the end cap by attaching the filter module to a distal end of the end cap.

18. The method of claim 17, further comprising:
   fixing an extended-length end cap that is longer than the end cap to the canister intermediate flange;
   supporting a flow control valve with the extended-length end cap;
   fluidly coupling the flow control valve with the separator to issue a nitrogen-enriched air flow from the canister; and
   fluidly coupling the filter module to the separator to provide a compressed air flow to the separator.

* * * * *